United States Patent [19]

Hareng et al.

[11] 4,427,997

[45] Jan. 24, 1984

[54] CONTROL DEVICE FOR A DISPLAY SCREEN AND DISPLAY SCREEN CONTROLLED BY THIS DEVICE

[75] Inventors: Michel Hareng; Robert Hehlen; Serge Le Berre; Pierre Leclerc; Philippe Marcenac; Jean-Noël Perbet, all of Paris, France

[73] Assignee: Thomson-CSF, Paris, France

[21] Appl. No.: 328,497

[22] Filed: Dec. 8, 1981

[30] Foreign Application Priority Data

Dec. 15, 1980 [FR] France ................. 80 26544

[51] Int. Cl.³ ............................................. H04N 5/74
[52] U.S. Cl. ..................... 358/236; 358/241; 340/784
[58] Field of Search ............. 358/236, 230, 241; 340/784

[56] References Cited

FOREIGN PATENT DOCUMENTS 2245077 4/1975 France .
2389955 12/1978 France .
2042237 9/1980 United Kingdom .

OTHER PUBLICATIONS

IBM Technical Bulletin, "Liquid Crystal Display System" vol. 16, No. 4, Sep. 1973.

*Primary Examiner*—Richard Murray

[57] ABSTRACT

The invention relates to planar display screens and more particularly to smectic liquid crystal screens.

One of the problems of high definition display screens (approximately 100 to 1000 lines and columns) is caused by the devices for controlling the heating current on the lines. The complexity of the installation and costs limit the increase in the definition. The invention arranges the N lines of a screen into $\sqrt{N}$ groups of lines supplied at each of their ends by $\sqrt{N}$ control devices functioning sequentially, i.e. $2\sqrt{N}$ devices in all. Moreover, each line has a diode placed between the heating resistor and the common point of the circuit.

Application to the display of images transmitted in the form of a video signal for television and display peripheral equipment in teletransmission.

6 Claims, 8 Drawing Figures

CONTROL DEVICE FOR A DISPLAY SCREEN AND DISPLAY SCREEN CONTROLLED BY THIS DEVICE

BACKGROUND OF THE INVENTION

The present invention relates to a device for displaying images transmitted in the form of an electric signal, commonly called a video signal. Among the various possible display devices, the invention more particularly applies to matrix-type, high definition liquid crystal display screens. It relates to the matrix sweep or scan circuit organized so as to obtain a high definition by means of a smaller number of sweep control devices.

The invention more particularly applies to display screens incorporating liquid crystals in the smectic phase and which are current-controlled.

It is known that on cooling a thin layer of material having a smectic phase and on starting from the liquid phase, the optical appearance of the thin layer significantly depends on the cooling rate. If cooling takes place slowly, the material is uniformly oriented and the layer appears perfectly transparent. However, if the transition from the liquid phase to the smectic phase takes place very rapidly, areas form in the layer having different orientations from one another and leading to a high diffusion of the transmitted or reflected light.

It is known to use this effect for recording an image on a liquid crystal film having a smectic phase. The material, which is placed between two transparent plates, is kept at a temperature such that it is in its smectic phase, the recording of an image point being obtained by heating the liquid layer followed by rapid cooling. It is known to supply the necessary heat quantity for melting the liquid crystal layer by infrared radiation or laser radiation.

On May 5th 1977, the present Applicant Company filed French Patent Application No 77,13 738 according to which it is possible to increase the image recording speed in a layer of material having such a thermoelectric effect by using filament resistors making it possible to record an image line-by-line, so that then the duration of one line is available for recording simultaneously all the points of said line. This recording and erasure process is faster than optical processes and makes it possible to come close to recording video images on a display screen.

However, the design of high definition display screens according to this process comes up against a problem linked with the number of lines and columns of the matrix of points defining the image, said higher number corresponding to a high number of electronic control devices for the line-by-line sweep.

Hereinafter, the term control electronics is used to define all the devices making it possible to pass current into a line of the screen matrix, said device more particularly comprising one or two power transistors, the transistors which control their bases and the clock systems, shift registers and other sequencers.

The various known matrix display panels and display screens, no matter whether they use light-emitting diodes, liquid crystals, plasma or are electrolytic are confronted with the construction of the external control electronics and particularly the price thereof. Thus, a high definition display screen, having for example 512 or 1024 lines or columns corresponding essentially to the definition of a television image according to existing standards, thus assumes the association of 512 or 1024 connections to 512 or 1024 external control electronics, which is very costly in practice. Such cabling using wires or multicore flat cables in accordance with the prior art can be performed in the laboratory, but does not form an industrial solution. This is made worse by the fact that the cost of the control electronics is actually higher than that of the display screen.

BRIEF SUMMARY OF THE INVENTION

The device according to the invention makes it possible to retain a high definition for the display screen and considerably reduce the number of external electronic control devices by a multiplexing-type combination. Under these conditions, besides reducing the cost price, the association with a smectic liquid crystal screen of a small number of input and output connections and a small number of control electronics, makes it possible to integrate on the same substrate of the large-size hybrid circuit type, on a glass plate or an enamelled plate the entire display screen comprising the display panel, the column control electronics (video signal), the line control electronics (crystal heating), the access to the display screen only involving a small number of connections provided by a plug-in connector.

If the definition of the screen corresponds to N lines, said N lines are organized into $\sqrt{N}$ groups each having $\sqrt{N}$ resistors controlled by one of their ends, which will be called an access channel, by $\sqrt{N}$ control electronics, each of which is joined to one of the groups of resistors, and controlled at the other end by another group of $\sqrt{N}$ control electronics, each of which is joined to a single resistor of each of the groups.

More specifically, the present invention relates to a control device for a display screen reproducing the images scanned in the form of a frame of lines and columns and represented by a video signal, said screen comprising a layer of a material on which a recording or inscription can be made by a mixed thermal and electric effect in which the lines of the frame, constituted by heating lines deposited on a substrate, are sequentially recorded by means of a current, wherein for a definition of N lines the device comprises $2\sqrt{N}$ electronic devices for controlling the current in the lines arranged in the form of $\sqrt{N}$ devices connected to one end of the $\sqrt{N}$ groups of lines and of $\sqrt{N}$ devices, each of which is connected to the other end of a single line of each of the $\sqrt{N}$ groups of lines and wherein each line is constituted by a heating resistor in series with a non-linear element in I/V.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
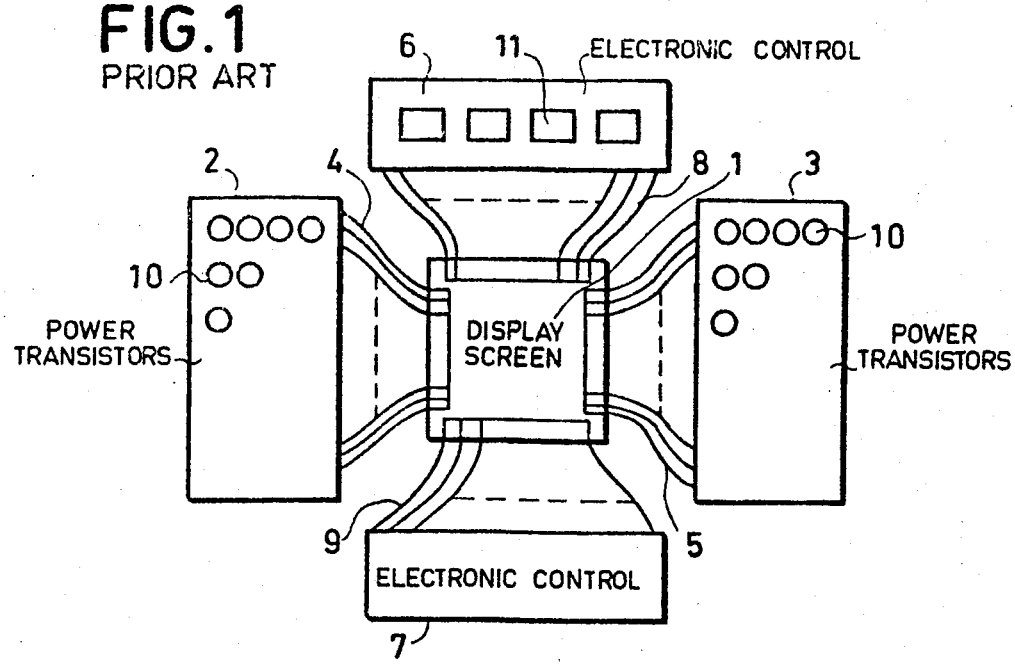
FIG. 1 the simplified diagram of a prior art matrix display panel.

FIG. 1 is the simplified diagram of a matrix display panel according to the prior art. Matrix display panel 1 comprises either light-emitting diodes, or liquid crystals or a plasma. The invention will be described on the basis of the present case of a smectic liquid crystal screen, i.e. points of the screen are heated for their recording and erasure. This display panel 1 is controlled in accordance with the horizontal lines by an electronic control assembly, i.e. a panel 2 at one end of the lines and a panel 3 at the other end of the lines. The control electronics need only have a single panel at one end of the lines, the other end being connected to the common point of the circuit. However, in any case, it is necessary to have between the control electronics and the common point of the circuit two circuits, generally etched in a metal layer deposited on a flexible support, said two circuits constituting the connections 4 and 5 between the lines of the display panel and the electronic control circuits. In the same way, the vertical columns of the display panel are controlled from two electronics control circuits 6 and 7 electrically connected to the display panel by flexible circuits or multicore flat cables 8 and 9.

The control electronics of the lines is diagrammatically and symbolically represented on panels 2 and 3 by a certain number of power transistors 10. If the definition of the high definition display panel is, for example, 1024 lines, there are then at least 1024 power transistors 10. With regard to the vertical columns recording takes place from an electric signal supplied by the control electronics of panel 6 on which are symbolically represented a certain number of integrated circuits 11. The different points of the same line are recorded simultaneously when the line has been heated by means of a power transistor 10.

The invention relates to the control of lines which are heated sequentially. All the points of the same line are simultaneously recorded, e.g. by a video signal which is not modified by the invention.

Figure 2:
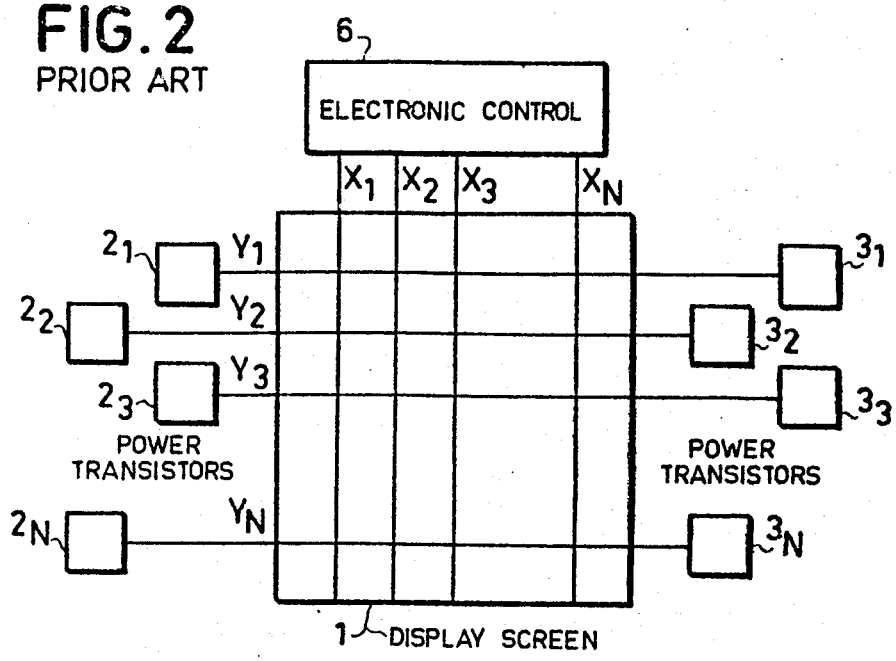
FIG. 2 the operating diagram of a smectic crystal display screen.

FIG. 2 relates to the operation of a smectic crystal display screen and constitutes a magnification of the central part of FIG. 1.

The display screen 1 is constituted by a thin film of liquid crystals enclosed between a solid substrate serving as the case base and a transparent plate serving as the case cover, the transparent plate giving access to the display. On the substrate are, for example, etched horizontal lines of ordinates $Y_1 Y_2 Y_3 \ldots Y_N$ in the form of metal coatings deposited on the substrate and having a resistance of approximately 50 Ohms. On the transparent plate are deposited other semi-transparent metal coatings constituting the vertical columns of abscissas $X_1 X_2 X_3 \ldots X_N$. The horizontal lines are heated so as to bring the smectic liquid crystal into a liquid state. Each line is sequentially heated by a power of approximately 20 Watts peak passing through the control electronics $2_1$ associated with $3_1$ for line $Y_1$, $2_2$ associated with $3_2$ for line $Y_2$, etc.

When a smectic crystal line has been heated, the different points forming the same are recorded or inscribed in columns $X_1 X_2 X_3 \ldots X_N$ as from the control electronic 6 of the video signal. As a function of the voltage applied or not applied at an intersection point between the line in question and the columns, the smectic crystal is oriented or not oriented during its cooling and will have either a transparent or a diffuse appearance. This operation forms part of the prior art and has been briefly described to show the importance of the line control electronics in the case of a high definition screen, e.g. having between 600 and 1000 lines. The number of devices for controlling the current passage into the lines is at this time at least equal to the number of lines if the assembly of the control devices 3 is constituted by a common earth.

It must also be borne in mind that from a material standpoint, and quite apart from the control electronics, the links and connections become difficult to produce if for a screen of definition 1000×1000 it is necessary to cable 2000 external connections on the sides of the screen. The existing connection procedures, such as e.g. plug-in connectors for printed circuit cards cannot be used on such a screen. Moreover, in the case of such a large number of welds, there is a definite risk of one or two of them being defective.

The display screens according to the invention, e.g. using smectic crystals, make it possible to simplify the control procedure so as to make construction easier, more reliable and less costly. This is one of the objects of the invention, whereof one variant is shown in FIG. 3.

Figure 3:
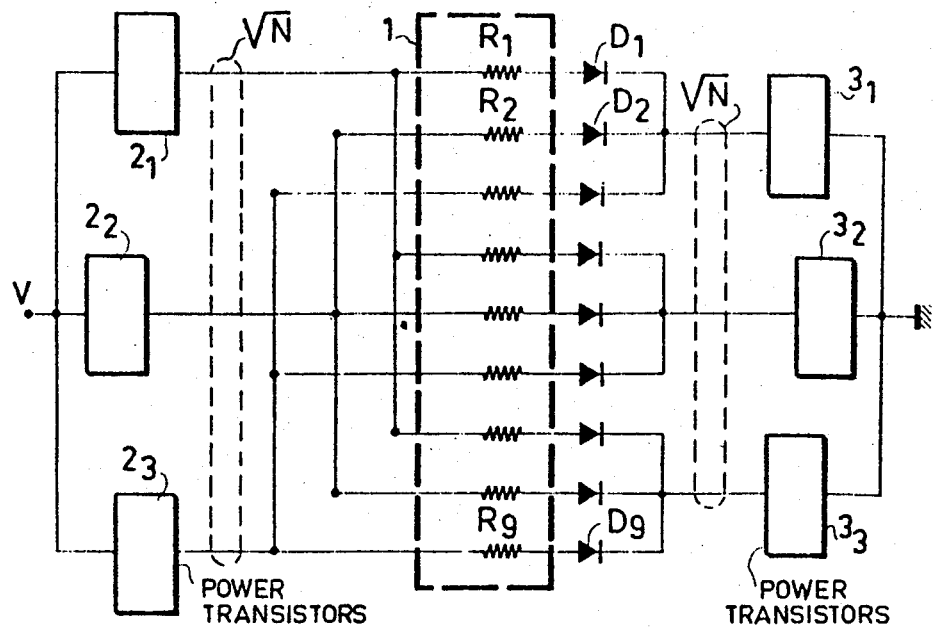
FIG. 3 the electric control diagram of the lines of a display screen according to the invention.

FIG. 3 diagrammatically shows 9 line resistors $R_1$ to $R_9$ current-controlled between earth and a source V across control electronics 2 and 3. This simplification of numbers has only been provided to facilitate understanding of the drawing which, for a 1000 line definition of the display screen, would have to have 1000 resistors and the associated control electronics. In more general terms, it is necessary to represent a number at least equal to N control electronics for a definition of N lines.

As stated hereinbefore, the control electronics are not only formed by a power transistor and instead represent a complete system of greater complexity of power transistors associated with a sequential programmed circuit also having the means for acting on the base of each of the power transistors, shift registers, clock, etc.

Thus, it is with a view to reducing the number of control systems that the lines are grouped and supplied sequentially by control systems which, combined in pairs, allow the current to pass into a single line. According to this construction, the N line heating resistors of screen 1 are grouped in $\sqrt{N}$ groups consisting in each case of $\sqrt{N}$ resistors. Each of the groups is connected to one of the ends of a control electronics 3, which therefore requires $\sqrt{N}$ control electronics for $\sqrt{N}$ groups of resistors.

Moreover, the passage of the current through the lines is controlled at the other end of the lines by $\sqrt{N}$ control electronics 2, each device 2 being connected to a single line of the $\sqrt{N}$ groups of lines. Consequently, each line is controlled in unitary manner by a sequential organisation such that a control electronics 2 associated with a control electronics 3 only allows current to pass through a single line. Thus, N lines are controlled by $2\sqrt{N}$ electronic control devices.

This simplification of the construction of a screen is of greatest importance in connection with high definition screens. Thus, if in place of a limitation to 9 lines controlled by 6 devices, consideration is given to the case of a screen with 1024 lines, it is now only necessary to have twice 32, i.e. twice $\sqrt{1024}$ control devices for 1024 line resistors.

Under these conditions, the installation in the vicinity of the display screen or on the actual support thereof of two series of 32 power transistors in each case leads to the expectation of high reliability.

In FIG. 3, each line also has a certain number of diodes at a rate of 1 diode for each heating line resistor. These diodes serve to prevent the simultaneous recording of a plurality of points on the same column. For each line, the diodes can either be located between the power supply and the heating resistor, or between the heating resistor and the common point of the circuit.

Figure 4:
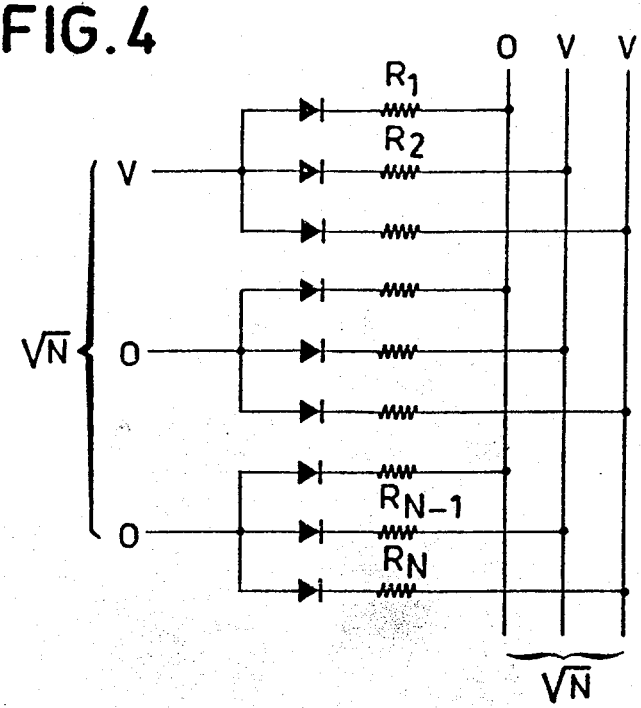
FIG. 4 a first arrangement of diodes for each line.
Figure 5:
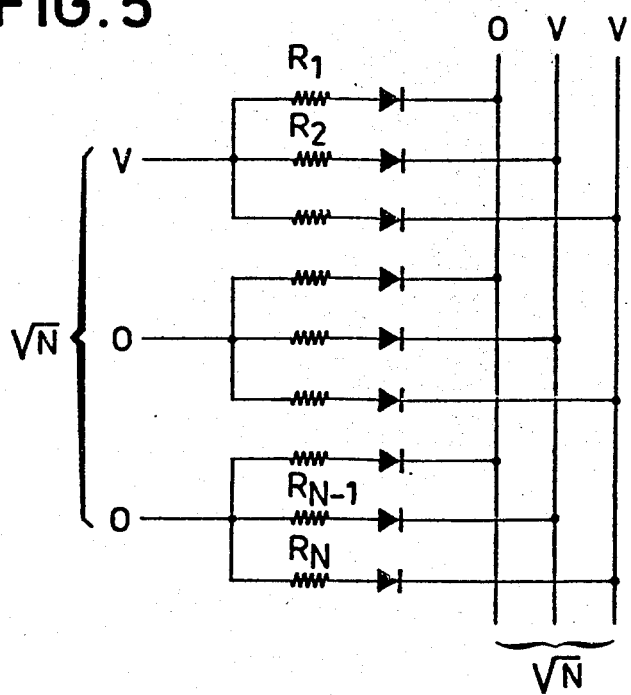
FIG. 5 a second arrangement of diodes for each line.

FIGS. 4 and 5 explain and justify the choice of one position for the diodes in preference to the other. The satisfactory operation of a smectic liquid crystal matrix makes it necessary to apply heating pulses with a peak value below the total erasure voltage and to apply a zero potential to the addressed line during cooling, the electric field of the video signal being applied between said line and the electrodes of the columns. The average potential applied throughout time T of an image is dependent on the relative position of the diodes and the heating resistor.

FIG. 4 shows the lines of a screen composed of diodes $D_1$ to $D_N$ and resistors $R_1$ to $R_N$, the diodes being connected to the resistors by their cathode. In the comparable FIG. 5, the diodes are joined to the resistors by their anode. If N is the number of lines during time T/N, we obtain in the case of FIG. 4: $\sqrt{N}-1$ resistors at zero and the other resistors at $+V$, i.e. live and in the case of FIG. 5: $\sqrt{N}-1$ at $+V$ and the other resistors at zero.

Thus, during the time T of one image a given resistor is under voltage V for $(\sqrt{N}-1) T/\sqrt{N}$ and under zero voltage for $T/\sqrt{N}$ in the case of FIG. 4. In the case of FIG. 5, voltage V is only applied during time $T/\sqrt{N}$, which is preferable with respect to the operation of the liquid crystals e.g. in connection with their life.

The construction of these diodes or in more general terms elements which are non-linear in I/V, is essentially dependent on the substrates used for the display screen.

In the case of substrates of the monocrystalline silicon type used in screens having small-size elementary points, i.e. of 20 to 100 microns, the conventional diodes can be directly integrated into the semiconductor substrate or connected according to hybrid circuit technology. In the case of e.g. glass substrates used in larger-size direct vision screens and having two to ten points per millimeter, the diodes are hybridized as hereinbefore or are produced from amorphous silicon.

Figure 6:
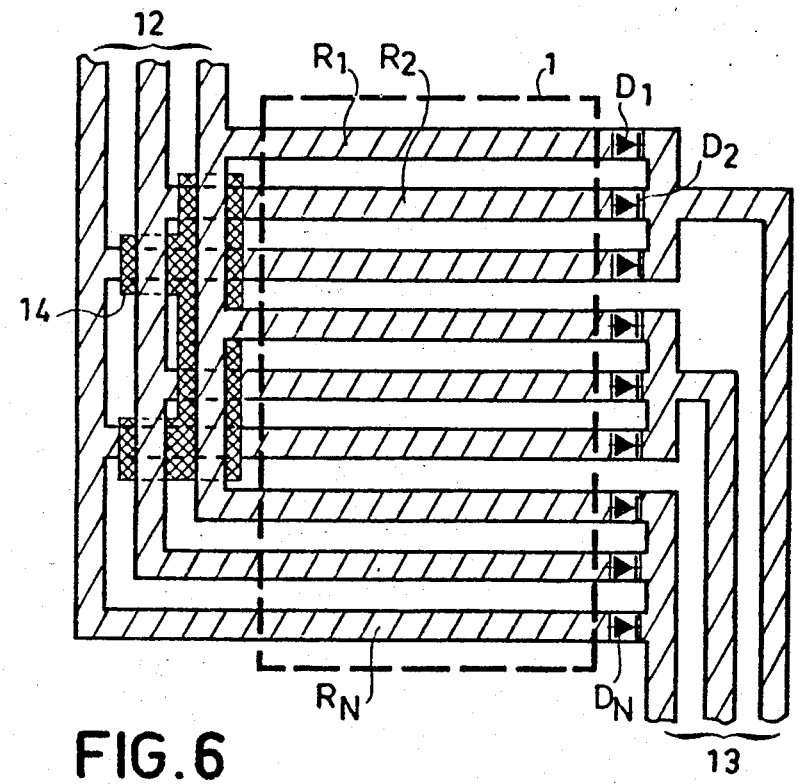
FIG. 6 the installation diagram of the circuit of the lines on the substrate.

FIG. 6 shows the diagram relating to the installation of the circuit of line resistors on the substrate in accordance with the present invention. On an e.g. glass substrate there are N filament resistors $R_1$ to $R_N$ corresponding to the screen lines within frame 1 defining the directions of the display screen. For example, these heating resistor lines are obtained by etching a vacuum-deposited aluminium coating and have a resistance of approximately 50 Ohms.

The lines of resistors are extended at their ends by metal deposits such as 12 and 13 at a rate of $\sqrt{N}$ metal connections 12 at one end of the lines of resistors and $\sqrt{N}$ metal connections 13 at the other end thereof. On the side where the metal connections overlap, to multiplex the joint resistors of different groups to the same metal connection, thicknesses of insulant 14 permit the overlapping of $\sqrt{N}$ metal connections.

The diodes $D_1$ to $D_N$ are e.g. implanted by hybridization preferably between the filament resistors and the common point. The non-addressed lines then have a zero current or the reverse current of said diodes. Thus, the performance levels of the didoes are dependent on the minimum power permitted in the lines.

Figure 7:
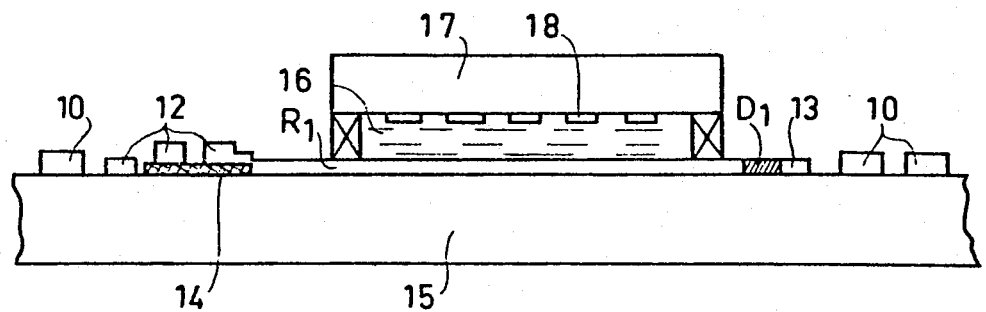
FIG. 7 a simplified sectional view of a display screen according to the invention.

FIG. 7 is a simplified sectional view of a display screen according to the invention. On a substrate 15 is produced a display screen constituted by a film of smectic liquid crystal 16 held in place by means of a transparent plate 17. The cavity within which is held the liquid crystal film is closed by appropriate means such as shims. Recording takes place between heating resistor lines, whereof only the first resistor $R_1$ is shown and semi-transparent metal coating columns 18 deposited on transparent cover 17.

As stated hereinbefore, the planar structure of the display device makes it possible to produce on the substrate the access metalizations of the lines at 12 and 13 and the diodes, whereof only the diode $D_1$ corresponding to line $R_1$ is shown.

As the object of the invention is to control a high definition display screen, i.e. with a large number of lines and columns, by means of a small number of electronic devices for the sequential control of the lines, the small number of access connections to the matrix screen makes it possible to connect the control electronics due to the actual screen to substrate 15.

FIG. 7 shows certain of the power transistors 10 forming part of the line control electronics. As stated hereinbefore, these transistors do not in themselves form the sequential sweep electronics assembly. However, in view of the fact that for e.g. 1024 lines it is sufficient to have 32 access connections to the lines and 32 power transistors at each end of the lines, it becomes conceivable to connect these transistors, as well as the signals electronics part controlling them to the substrate, thereby leading to significant economics in the manufacture of the equipment, as well as from the space standpoint.

Moreover, as it is possible to group the actual display screen, a small number of sequential sweep systems and the video signals part on the same substrate, the number of external accesses is considerably reduced and makes it possible to design a screen which can be plugged into a connector for printed circuits of existing types. This is shown in FIG. 8 where the various components of a display screen are grouped in the form of a block diagram.

Figure 8:
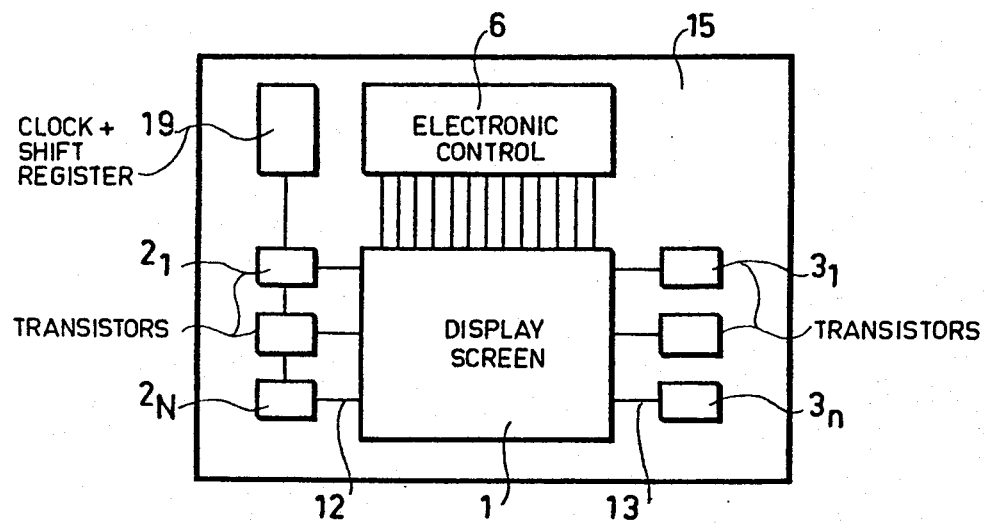
FIG. 8 the simplified installation diagram of a display screen according to the invention.

FIG. 8 should be compared with FIG. 1 showing the operation of a liquid crystal display screen and clearly illustrates the simplification of the circuit.

Display screen 1 is controlled along the columns by video signals from circuit 6. It is controlled along the lines by a small number of control circuits $2_1$ to $2_N$ and $3_1$ to $3_N$ due to the sequential control of the lines, which is controlled by a clock and a shift register diagrammatically indicated at 19.

The display screen according to the invention can be constructed as a plurality of mechanical parts electrically connected by flexible circuits. It can also be constructed in the manner shown in FIG. 8 by technologies similar to those of hybrid circuits using a single substrate 15, which only requires a small number of external connections and which permits easy replacement in the case when the device fails.

What is claimed is:

1. A control device for a display screen reproducing images scanned in the form of a frame of lines and columns and represented by a video signal, said screen comprising a layer of a material on which a recording or inscription can be made by a mixed thermal and electric effect in which the lines of the frame, constituted by heating lines deposited on a substrate are sequentially recorded by means of a current, wherein for a definition of N lines the devise comprises $2\sqrt{N}$ electronic devices for controlling the current in the lines, said devices being arranged in the form of $\sqrt{N}$ devices connected to one end of $\sqrt{N}$ groups of lines and of $\sqrt{N}$ devices each of which is connected to the other end of a single line of each of the $\sqrt{N}$ groups of lines, each line being constituted by a heating resistor in series with a diode.

2. A control device according to claim 1 wherein for each line the diode is positioned between the heating resistor and the lowest potential control electronics.

3. A display screen controlled by the device of claim 1, wherein the recordable material is of the smectic liquid crystal type.

4. A display screen according to claim 3, wherein the images are recorded line-by-line by a video signal applied to the columns as a result of the heating of each line.

5. A display screen according to claim 4, wherein overlaps of metal connecting strips between lines and electronic control devices are insulated by insulating layers deposited by screen process printing on the same substrate as the screen.

6. A display screen according to claim 5, wherein the electronic line control devices are connected to the same substrate as the screen and alongside the latter by hybrid circuit technology.

* * * * *